US 12,435,227 B2

(12) United States Patent
He et al.

(10) Patent No.: US 12,435,227 B2
(45) Date of Patent: Oct. 7, 2025

(54) MARKER INKS AND METHODS OF PREPARING THE MARKER INKS

(71) Applicant: SHENZHEN THOUSANDSHORES TECHNOLOGY CO., LTD., Guangdong (CN)

(72) Inventors: Ding He, Shenzhen (CN); Zhi Liu, Shenzhen (CN); Xufeng Yang, Shenzhen (CN); Dengwu Wu, Shenzhen (CN); Guohui Yang, Shenzhen (CN)

(73) Assignee: SHENZHEN THOUSANDSHORES TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/981,628

(22) Filed: Dec. 15, 2024

(65) Prior Publication Data

US 2025/0282966 A1    Sep. 11, 2025

(30) Foreign Application Priority Data

Mar. 6, 2024    (CN) .......................... 202410254467.2

(51) Int. Cl.
*C09D 11/17*    (2014.01)
(52) U.S. Cl.
CPC .................... *C09D 11/17* (2013.01)
(58) Field of Classification Search
CPC ..................................................... C09D 11/17
See application file for complete search history.

(56) References Cited

FOREIGN PATENT DOCUMENTS

CN    102796400 A  *  11/2012

OTHER PUBLICATIONS

English machine translation of CN-102796400-A (Year: 2012).*

\* cited by examiner

*Primary Examiner* — Jennifer A Smith
*Assistant Examiner* — Jeffrey Eugene Barzach
(74) *Attorney, Agent, or Firm* — Porus IP LLC

(57) ABSTRACT

The present disclosure provides a mark ink and a method for preparing the marker ink. The mark ink includes an azo-metal complex dye, a film-forming resin, and ethanol. The azo-metal complex dye is represented by a formula:

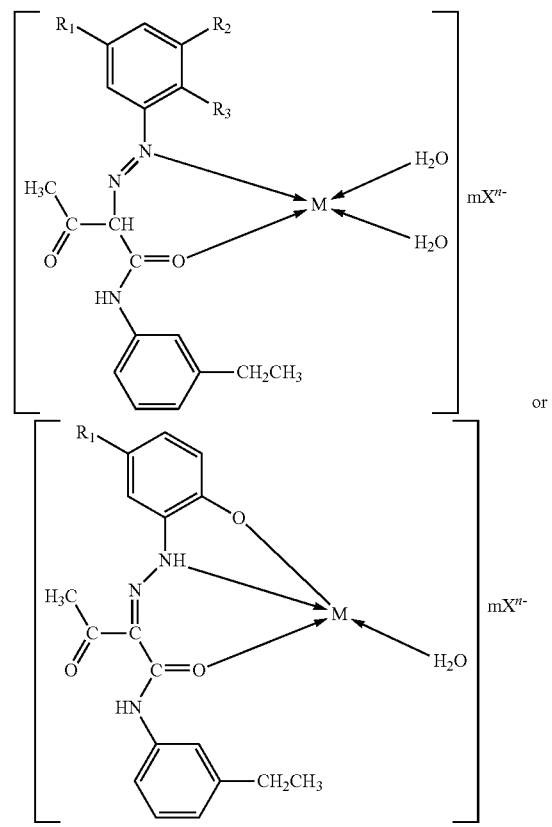

where, $R_1$, $R_2$, and $R_5$ are polar groups, M is a metal ion, $mX^{n-}$ is an anion, and n and m are positive integers.

20 Claims, 1 Drawing Sheet

100

---

Mixing a 2-amino-4-nitrophenol-6-sulfonic acid or a 2-amino-4-nitrophenol with $NaNO_2$ and a hydrochloric acid, and reacting at a certain temperature to obtain the diazonium salt solution — 110

↓

Dispersing a 5-ethylacetoacetanilide into an alkaline solution to obtain a first mixture — 120

↓

Adding an acetic acid solution to the first mixture to form a precipitate, adding a diazonium salt solution under a heating condition to obtain an intermediate product — 130

↓

Dispersing the intermediate product into the ethanol, adding a target compound, heating and refluxing, and then cooling to obtain the azo-metal complex dye — 140

↓

Dispersing an azo-metal complex dye and a film-forming resin into ethanol to obtain the marker ink — 150

MARKER INKS AND METHODS OF PREPARING THE MARKER INKS

CROSS REFERENCE TO RELATED APPLICATIONS

This application claims priority to Chinese Patent Application No. 202410254467.2 filed on Mar. 6, 2024, the entire contents of which are incorporated herein by reference.

TECHNICAL FIELD

The present disclosure relates to the field of ink research and development and manufacturing, and in particular relates to a marker ink and a method for preparing the marker ink.

BACKGROUND

An alcoholic marker ink uses alcohol as a solvent, which enables a high color purity and saturation, as a result, the alcoholic marker ink is favored by many drawing practitioners and enthusiasts. A quality of marker ink directly affects a using experience of the marker. The qualities of commercially available alcoholic marker inks vary, and some of them contain ketones, benzene and other irritating solvents, which bring health and safety hazards to a user. At the same time, coloring dyes used in the inks are susceptible to fading by ultraviolet rays in the environment and oxygen and ozone in the air, thus affecting a durability of the coloring. Additionally, some alcoholic marker ink systems are highly penetrated to media such as papers, which tends to result in wet and dry color differences and almost has no color overlaps. Therefore, there is a need to provide the marker ink and a method for preparing the marker ink to solve the above problems.

SUMMARY

One of the embodiments of the present disclosure provides a marker ink. The marker ink includes an azo-metal complex dye, a film-forming resin, and ethanol. The azo-metal complex dye is represented by a formula:

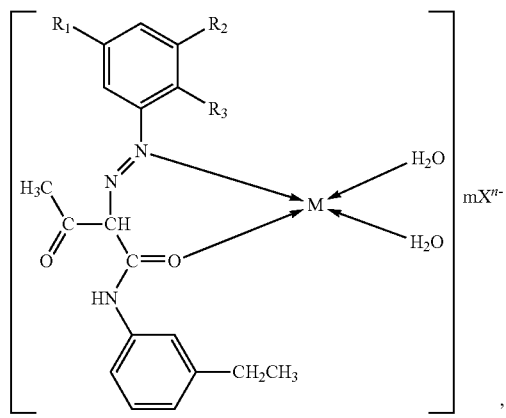

, or

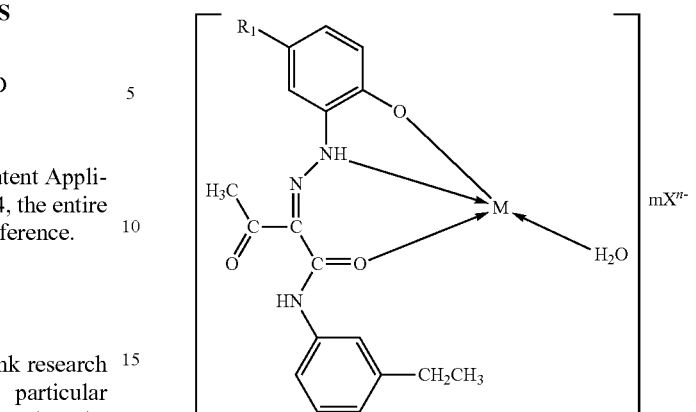

where, $R_1$, $R_2$, $R_3$ denote polar groups, M denotes a metal ion, $mX^{n-}$ denotes anions, and n and m are positive integers.

In some embodiments, M is selected from $Cu^{2+}$, $Fe^{3+}$, $Ag^+$, and $Zn^{2+}$, and X is Cl, n is 1, and m is in a range of 1-3, or $mX^{n-}$ does not exist.

In some embodiments, $R_1$, $R_2$, $R_3$ are independently selected from $NO_2$, $SO_3H$, and OH.

In some embodiments, the azo-metal complex dye is represented by a formula:

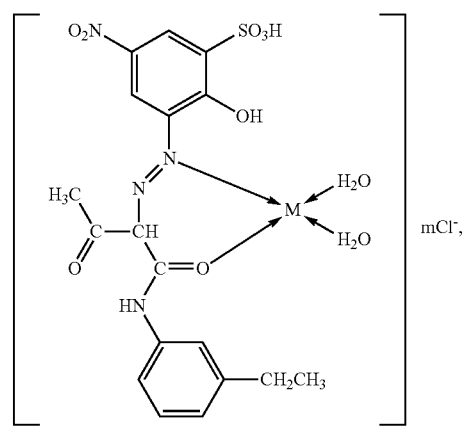

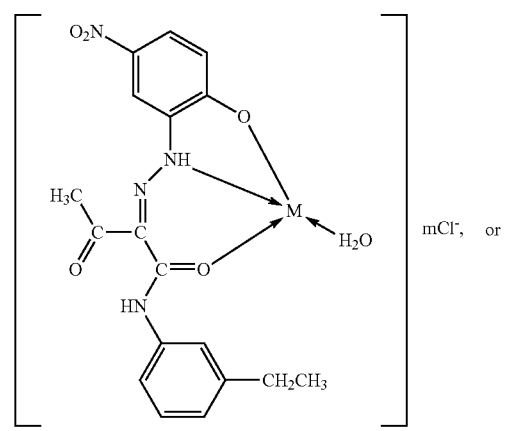

, or

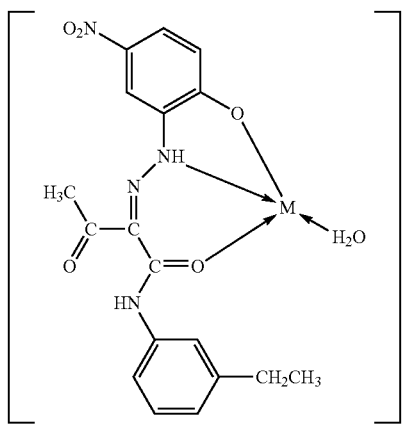

where, M is selected from $Cu^{2+}$, $Fe^{3+}$, $Ag^+$ and $Zn^{2+}$.

In some embodiments, the film-forming resin is selected from one or more of an aldehydic ketone resin, a polyvinylpyrrolidone resin, or an alcohol-soluble acrylic resin.

In some embodiments, in the marker ink, in parts by weight: the azo-metal complex dye accounts for 5 to 20 parts, the film-forming resin accounts for 2 to 10 parts, and the ethanol accounts for 25 to 80 parts.

In some embodiments, the marker ink further includes a leveling agent, a defoamer, a humectant, and a solubilizer.

In some embodiments, the leveling agent is selected from one or more a polyether or an organosilane.

In some embodiments, the defoamer is selected from one or more of a 6800 defoamer produced by Deuchem (Shanghai) Chemical Co. Ltd, a DF-114 defoamer produced by Dow Chemical Company, or an Airex 904W defoamer produced by Evonik Industries AG.

In some embodiments, the humectant is selected from one or more of a polyethylene glycol, a 1,4-butanediol, a glycerol, a castor oil, an ethylene glycol, a diethylene glycol, or a benzyl alcohol.

In some embodiments, the humectant is selected from one or more of a polyethylene glycol 400 (PEG-400), a polyethylene glycol 600 (PEG-600), or a polyethylene glycol 800 (PEG-800).

In some embodiments, the solubilizer is selected from one or more of a propylene glycol methyl ether, a propylene glycol butyl ether, or a dipropylene glycol methyl ether.

In some embodiments, in parts by weight: the leveling agent accounts for 0.5 to 2 parts, the defoamer accounts for 0.5 to 1 part, the humectant accounts for 2 to 5 parts, and the solubilizer accounts for 15 to 50 parts.

One of the embodiments of the present disclosure provides a method for preparing a marker ink. The method includes dispersing an azo-metal complex dye and a film-forming resin into ethanol to obtain the marker ink. The azo-metal complex dye is represented by a formular:

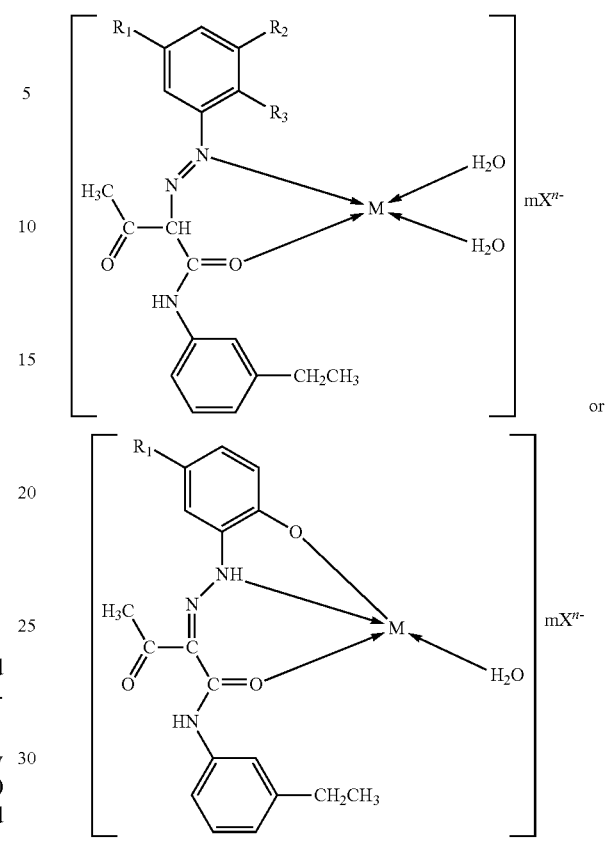

where, $R_1$, $R_2$, $R_3$ denote the polar groups, M denotes the metal ion, $mX^{n-}$ denotes the anions, and n and m are positive integers.

In some embodiments, M is selected from $Cu^{2+}$, $Fe^{3+}$, $Ag^+$, and $Zn^{2+}$, $R_1$, $R_2$, $R_3$ are independently selected from $NO_2$, $SO_3H$, and OH, X is Cl, n is 1, and m is in a range of 1-3, or $mX^{n-}$ does not exist.

In some embodiments, the azo-metal complex dye is represented by a formula:

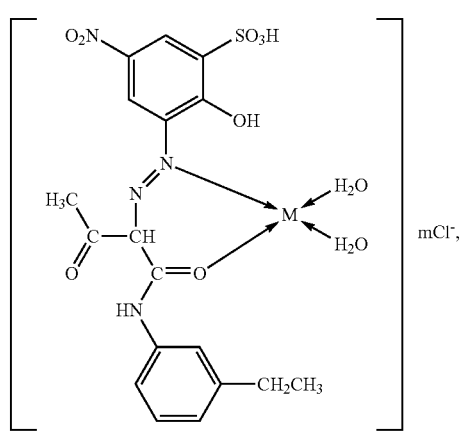

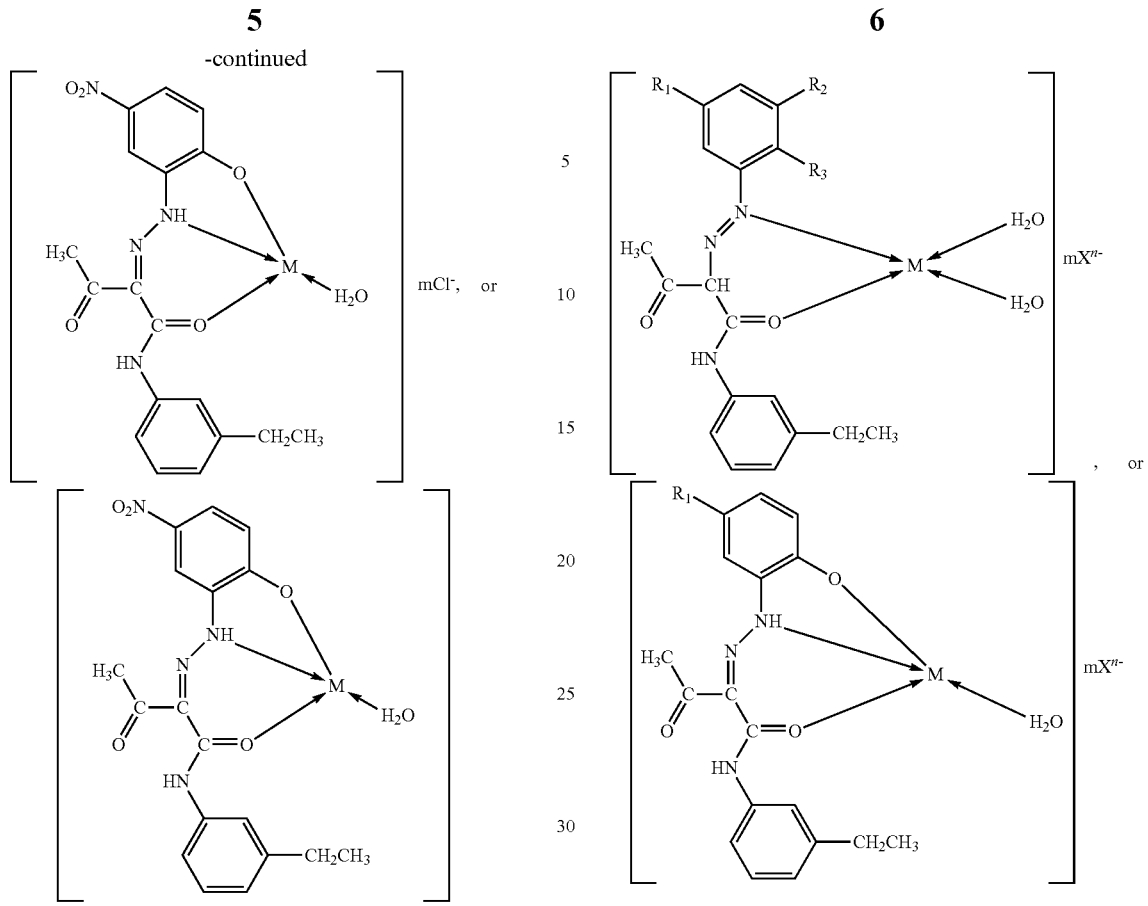

where M is selected from $Cu^{2+}$, $Fe^{3+}$, $Ag^+$ and $Zn^{2+}$.

In some embodiments, the azo-metal complex dye is prepared by: dispersing a 5-ethylacetoacetanilide into an alkaline solution to obtain a first mixture; adding an acetic acid solution to the first mixture to form a precipitate, adding a diazonium salt solution under a heating condition to obtain an intermediate product; and dispersing the intermediate product into the ethanol, adding a target compound, heating and refluxing, and then cooling to obtain the azo-metal complex dye, the target compound being selected from $CuCl_2 \cdot 2H_2O$, $FeCl_3 \cdot 2H_2O$, $AgNO_3$, and $ZnCl_2 \cdot 2H_2O$.

In some embodiments, the diazonium salt solution is prepared by: mixing a 2-amino-4-nitrophenol-6-sulfonic acid or a 2-amino-4-nitrophenol with $NaNO_2$ and a hydrochloric acid, and reacting at a certain temperature to obtain the diazonium salt solution.

In some embodiments, the method further includes: dispersing the azo-metal complex dye, the film-forming resin, a defoamer, a solubilizer, a humectant, and a leveling agent into the ethanol to obtain the marker ink, wherein in the marker ink, in parts by weight: the azo-metal complex dye accounts for 5 to 20 parts, the film-forming resin accounts for 2 to 10 parts, the ethanol accounts for 25 to 80 parts, the leveling agent accounts for 0.5 to 2 parts, the defoamer accounts for 0.5 to 1 part, the humectant accounts for 2 to 5 parts, and the solubilizer accounts for 15 to 50 parts.

One of the embodiments of the present disclosure provides a marker pen including a nib, a body, and an ink. The ink includes an azo-metal complex dye, a film-forming resin, and ethanol, the azo-metal complex dye being represented by a formula:

where, $R_1$, $R_2$, $R_3$ denote polar groups, M denotes a metal ion, $mX^{n-}$ denotes an anion, and n and m are positive integers.

Additional features are set forth in part in the description which follows, and in part are apparent to those skilled in the art upon examination of the following and the accompanying drawings or are learned by production or operation of the examples. The features of the present disclosure are realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein:

FIG. 1 is a flowchart illustrating an exemplary process for preparing a marker ink according to some embodiments of the present disclosure.

DETAILED DESCRIPTION

As used in the disclosure and the appended claims, the singular forms "a," "an," and "the" include plural referents unless the content clearly dictates otherwise. In general, the terms "comprise" and "include" merely prompt to include steps and elements that have been clearly identified, and these steps and elements do not constitute an exclusive listing. The methods or the devices may also include other steps or elements.

Numerical ranges used herein are intended to concisely and concisely describe each value included within that range.

One of the embodiments of the present disclosure provides an azo-metal complex dye, a film-forming resin, and ethanol.

The azo-metal complex dye refers to a complex dye formed by a ligand binding of a dye molecule and a metal ion, which contains an azo group (i.e., —N═N—) in molecular structures of the azo-metal complex dye. The azo-metal complex dye usually has stable chemical properties and good coloring effects, and are widely used in many fields such as textile, printing, and coating, etc.

The azo-metal complex dye acts primarily to provide the marker ink with the color effects and properties required to improve the coloring effect of the marker ink on paper or other materials. The molecular structures of azo-metal complex dye include unsaturated groups containing π-bonds (such as benzene rings, carboxyl groups, ester groups, nitro groups, etc.) and antioxidant groups (such as phenol hydroxyl groups, etc.), etc., which helps to maintain stability in ultraviolet rays, oxygen, ozone, and other environments, so as to ensure a long-lasting coloring performance, and also helps to reduce the penetration to avoid wet and dry color differences when writing and drawing using the marking ink, and further makes the ink to have a certain color stacking performance.

In some embodiments, the azo-metal complex dye is represented by a formula:

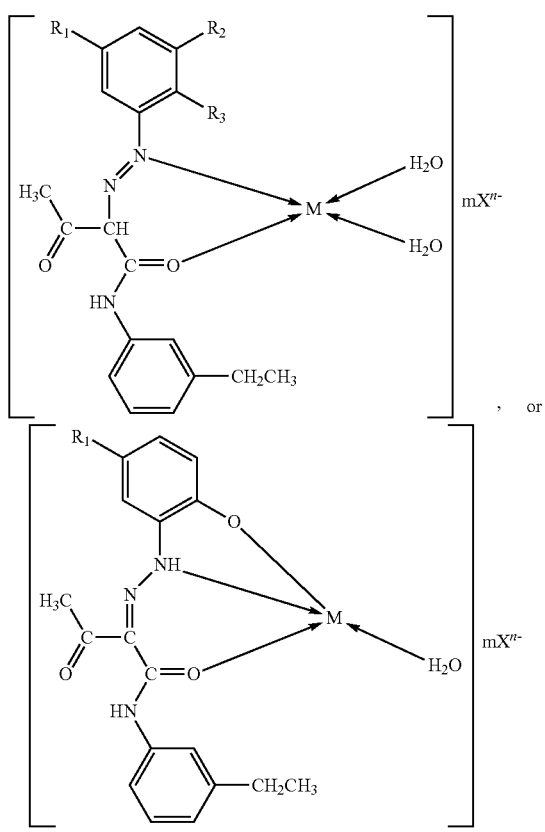

where, $R_1$, $R_2$, and $R_3$ denote polar groups, and M denotes the metal ion.

$R_1$, $R_2$, and $R_3$ refer to groups on the benzene rings in the azo-metal complex dye which are used to provide certain properties to the azo-metal complex dye. In some embodiments, $R_1$, $R_2$, and $R_3$ are polar groups. The polar groups refer to groups whose positive and negative charge centers do not overlap. The polar groups typically show significant electric dipole moments in molecules. This property allows the polar groups to form hydrogen bonds or ion-solvent interactions with polar molecules in a polar solvent, thereby disassociating the azo-metal complex dye that contain the polar groups and allowing them to be solubilized in the polar solvent.

In some embodiments, $R_1$, $R_2$, and $R_3$ are independently selected from nitro ($NO_2$), sulfonyl ($SO_3H$), and hydroxy (OH). By selecting $R_1$, $R_2$, and $R_3$ in $NO_2$, $SO_3H$, and OH, it is possible to make the azo-metal complex dye contain more strongly polar groups, making the azo-metal complex dye soluble in the more polar ethanol solvent.

M denotes a central ion at an inner boundary of the complex (i.e., a complex unit, usually indicated in square brackets) in the azo-metal complex dye, and is used to provide empty orbitals to accept electron pairs from a ligand to form the complex unit. In some embodiments, M denotes the metal ion. On the one hand, the metal ions, when cooperating with the dye molecules, are able to enhance the stability and a glossiness of the dye; on the other hand, a portion of the metal ions are colored ions, which are able to enhance a color depth of the dye.

In some embodiments, M is selected from $Cu^{2+}$, $Fe^{3+}$, $Ag^+$, and $Zn^{2+}$. By selecting M among $Cu^{2+}$, $Fe^{3+}$, $Ag^+$, and $Zn^{2+}$, more toxic traditional heavy metal elements, such as chromium and cobalt, are replaced to be taken as the central ions of the azo-metal complex dye to make an environmentally friendly marker ink.

$mX^{n-}$ refers to an external ion (usually indicated outside the square bracket) of a complex in the azo-metal complex dye, which is used to balance inner boundary charges of the complex and to improve specific properties (e.g., dielectric properties, solubility properties, etc.) of the complex. X refers to an element corresponding to the external ions, n refers to a charge count of the external ions, and m refers to an ion count of the external ions. In some embodiments, $mX^{n-}$ is an anion, and n and m are positive integers. Understandably, when M is selected from positive metal ions, $mX^{n-}$ is set to be the anion, and n and m are positive integers, to ensure a charge balance of the complex.

In some embodiments, X is Cl, n is 1, and m is in a range of 1-3. In some embodiments, $mX^{n-}$ does not exist. It is appreciated that when M is selected from $Cu^{2+}$, $Fe^{3+}$, $Ag^+$, and $Zn^{2+}$, the X is set to be Cl, n is 1, and m is in a range of 1-3, or $mX^{n-}$ does not exist. Appropriate external ions and their charge count and ion count are set according to different valence states of M to keep the complex in a trimmed state.

In some embodiments, the azo-metal complex dye is represented by a formula:

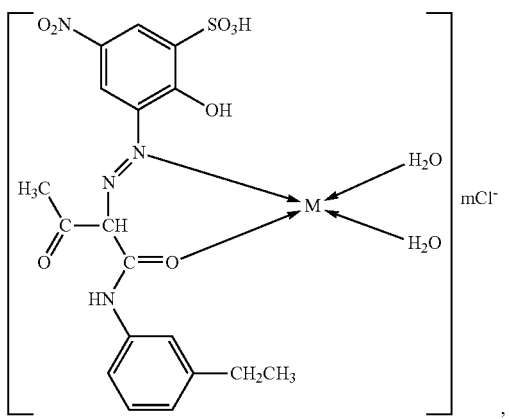
,
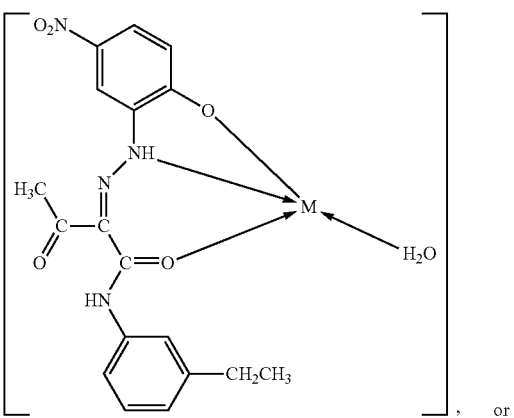
, or
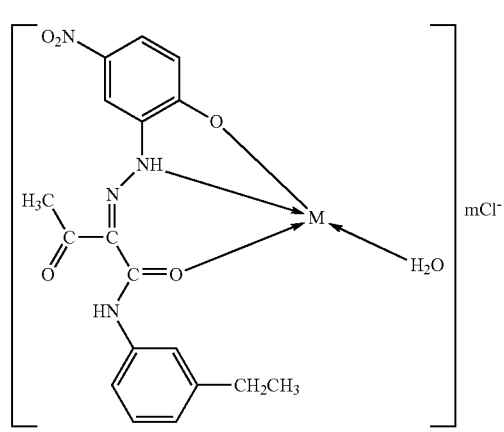
where M is selected from $Cu^{2+}$, $Fe^{3+}$, $Ag^+$ and $Zn^{2+}$.
In some embodiments, when M is $Cu^{2+}$, the azo-metal complex dye is represented by the formula:
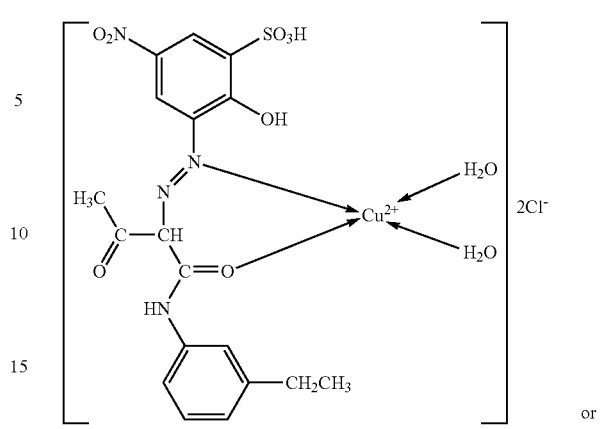
or
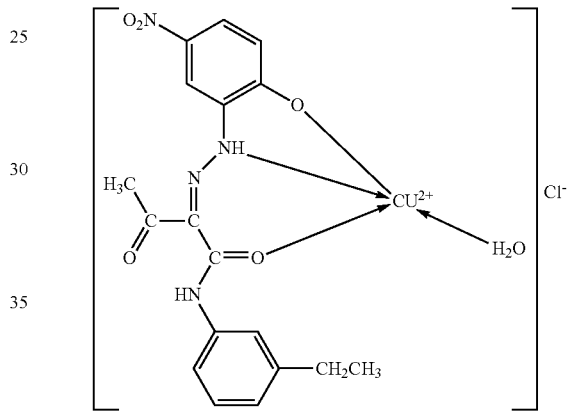
In some embodiments, when M is $Fe^{3+}$, the azo-metal complex dye is represented by the formula:
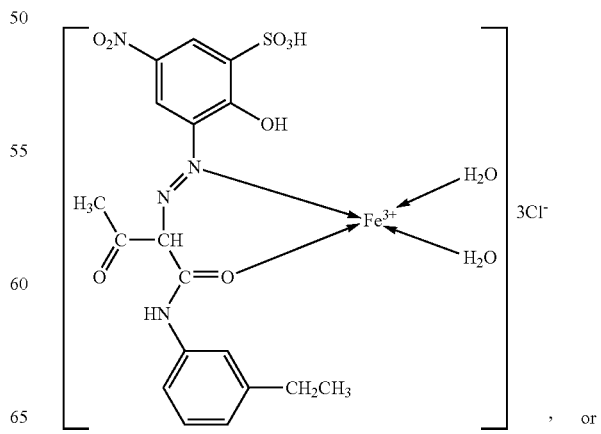
, or

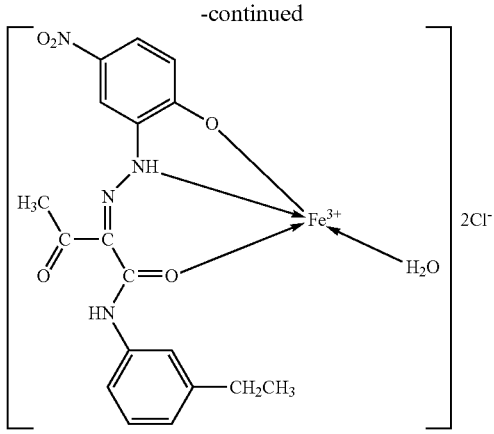

In some embodiments, when M is Ag⁺, the azo-metal complex dye is represented by the formula:

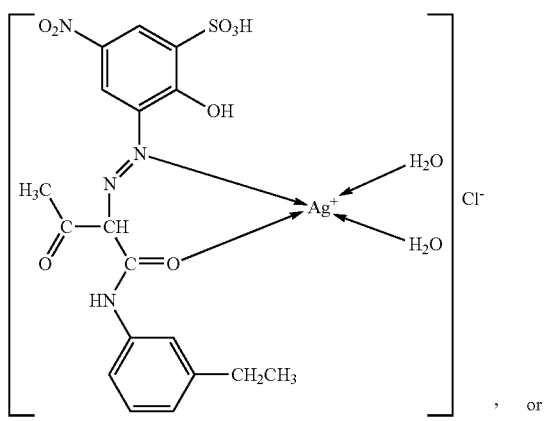

, or

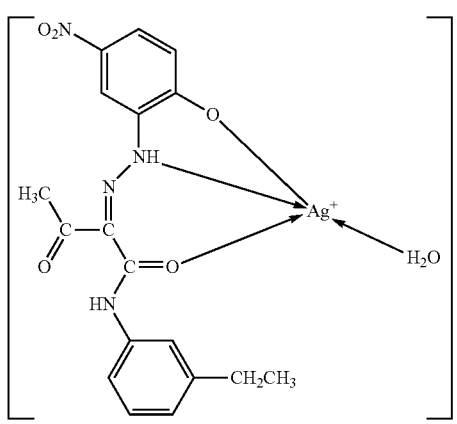

In some embodiments, when M is $Zn^{2+}$, the azo-metal complex dye is represented by the formula:

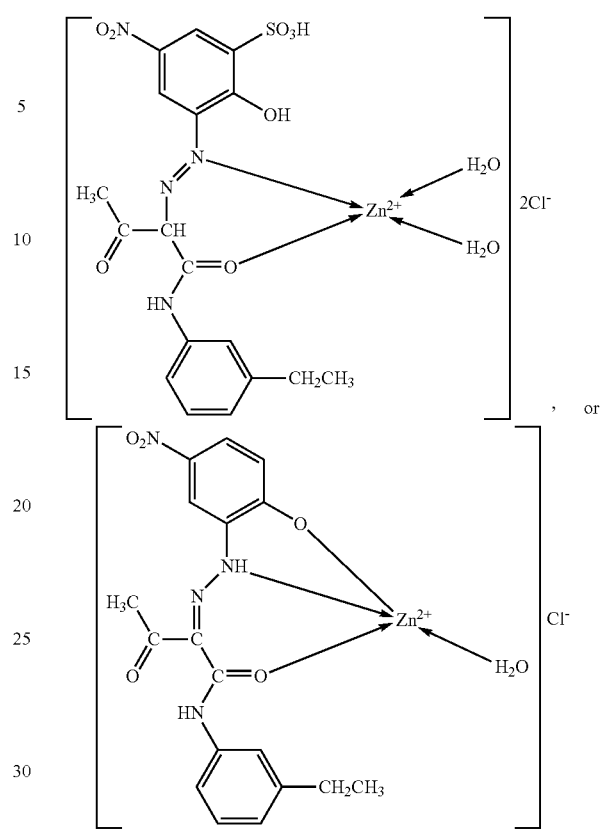

, or

By using the azo-metal complex dye with the above structure, the azo-metal complex dye is able to have good alcohol solubility, stability (an abrasion resistance, an ultraviolet (UV) resistance, an oxidation resistance), dyeing performance (an anti-penetration, a color stacking ability) and environmental protection performance, which is able to adapt to a variety of dyeing scenarios.

The film-forming resin refers to a resin that forms a film on a surface of an object being coated. A film-forming principle of the film-forming resin mainly includes a physical film-forming and a chemical film-forming. The physical film-forming includes a solvent evaporation film-forming (after the solvent evaporates, the polymer molecules of the film-forming resin gradually aggregate to form a film), a hot-melt film-forming (the film-forming resin is melted by heating, and then the film is formed by extruding or flow-coating, etc.), etc. The chemical film-forming includes a cross-linking reaction film-forming (under conditions of heating, catalyst, etc., chemical bonds between the film-forming resin molecules undergo cross-linking reactions to form a three-dimensional grid structure to form the film), and a polymerization reaction film-forming (under a certain condition, the film-forming resin undergoes polymerization reactions to form a polymer film with a high molecular weight), etc. Understandably, the film-forming resin, due to its film-forming property, usually has a high polarity, a high cross-linking and a great molecular weight, which makes the film-forming resin to be equally excellent in terms of solubility, chemical stability, etc., and has a high viscosity.

Through a physical process (e.g., the evaporation of solvents from the ink, etc.) or a chemical reaction (e.g., an addition of the catalyst, etc.), the film-forming resin forms a strong film, which holds a pigment in place and creates a lasting image or text. The film-forming resin has properties of high molecular weight and high viscosity, which play a thickening role and makes the ink made less likely to leak. The molecular structure is usually equipped with the polar groups, which makes it easier to interact with the polar solvents in a process of solubilization, and improves an solubility of a pigment system in ethanol.

In some embodiments, the film-forming resin is selected from one or more of an aldehydic ketone resin, a polyvinylpyrrolidone resin, or an alcohol-soluble acrylic resin. By using the above film-forming resin, the solubility of the azo-metal complex dye in ethanol is promoted, and the marker ink is made to show a moderate viscosity (understandably, when the viscosity is too high, the marker ink made is not easy to flow out, and when the viscosity is too low, an ink leakage is likely to occur).

The ethanol is used to provide the solvent for the marker ink. The ethanol is able to interact with other components (e.g., the azo-metal complex dye, the film-forming resin, etc.), disperse and solubilize the above components so that the ink flows and writes smoothly. In addition, the volatility of the ethanol makes it easier for the ink to dry and less likely to leave halo marks after evaporation.

By setting the marker ink including the azo-metal complex dye, the film-forming resin, and the ethanol, the marker ink that is well dispersed and weather-resistant is obtained, which is capable of maintaining stability in a variety of environments such as under the ultraviolet rays, the oxygen, the ozone, etc., the occurrence of the marker ink Leakage is effectively reduced in writing and drawing, and a certain overlapping color performance is ensured. Additionally, the marker ink does not contain irritating solvents such as ketones, benzene, and heavy metal elements such as chromium and cobalt, which are more toxic, and is environmentally friendly, and does not bring health and safety hazards to a user.

In some embodiments, in parts by weight, in the marker ink, the azo-metal complex dye accounts for 5 to 20 parts, the film-forming resin accounts for 2 to 10 parts, and the ethanol accounts for 25 to 80 parts.

Understandably, when there are too little azo-metal complex dye, the color and its coverage are too light; when there are too much azo-metal complex dye, the color and its coverage are too deep; when there are too little film-forming resin, the viscosity is too low, and the ink leaks; when there is too much film-forming resin, the viscosity is too high and the ink is not easy to flow out; when there is too much ethanol or too little ethanol, the dispersibility and solubility are affected, which ultimately leads to poor ink performance and writing experience.

By setting the azo-metal complex dye to account for 5 to 20 parts, the film-forming resin to account for 2 to 10 parts, and the ethanol to account for 25 to 80 parts, an ink system with a moderate viscosity, with a color and coverage that meet requirements, and with a good dispersibility and solubility is obtained.

In some embodiments, the marker ink further includes at least one of a leveling agent, a defoamer, a humectant, and a solubilizer. For example, the marker ink further includes the leveling agent, the defoamer, and the humectant. As another example, the marker ink further includes the leveling agent, the defoamer, the humectant, and the solublizer Ther leveling agent refers to an additive that improves a surface flatness and smoothness of the ink. Common types of leveling agents include a surface-active agent type, a polymer type, a silicone type, a reactive type, an additive type, etc. By adding the leveling agent to the marker ink, an ink flow in prompt, and an ink wetting is increased.

In some embodiments, the leveling agent is a combination of one or more of a polyether and an organosilane, for example, BYK-333 produced by BYK-Chemie GmbH, and Diego 2100 from DGL International Co., Ltd., etc. By selecting the leveling agent to be a combination of one or more of a polyether and an organosilane, the marker ink with better adaptability, fluidity, and wetting is obtained.

The defoamer is an additive that prevents or eliminates foam. Common types of defoamers include natural oils and fats, alcohols, polyethers, etc. The defoamer is able to quickly reduce a surface tension of the ink, making it easy for bubbles on a surface of a liquid to burst and dissipate. By adding the defoamer to the marker ink, the bubbles are effectively eliminated from the ink, which helps to maintain a uniformity, the fluidity, and the stability of the ink, and prevents the bubbles from affecting a using effect and prolongs a service life.

In some embodiments, the defoamer is selected from one or more of a Hynes Deuchem 6800 defoamer (which is referred to as "Deuchem 6800") produced by Deuchem (Shanghai) Chemical Co. Ltd, a DF114 defoamer (which is referred to as "Dow 114") produced by Dow Chemical Company, and an Airex 904W-defoamer (which is referred to as "TEGO-904W") produced by Evonik Industries AG. Selecting an appropriate defoamer ensures a compatibility of the defoamer with the ink components and avoids negative impacts on the ink performance such as changes in viscosity and color. By using the above defoamer, the ink system with a high degree of compatibility is achieved while ensuring a defoaming effect.

The humectant refers to a chemical that retains moisture and prevents water loss. For the convenience of the writer, it is required that the marker is able to write normally after being left for a period of time without a cap, which places a high requirement on a moisturizing property of the ink. The humectant prolongs a time for the ink to write normally without the cap. With the addition of the humectant, a dry nib is prevented, and a moisturizing property of the ink is enhanced.

In some embodiments, the humectant includes a glycerin, a propylene glycol, a hyaluronic acid, a urea, a lactic acid, etc. In some embodiments, the humectant is selected from one or a combination of the polyethylene glycol, 1,4-butanediol, glycerol, castor oil, ethylene glycol, diethylene glycol, and benzyl alcohol. The above moisturizing agent selected shows a better moisturizing performance in the ink system, reduces an ink drying rate, and prolongs the service life. The polyethylene glycol is selected from one or a combination of polyethylene glycol 400 (PEG-400), polyethylene glycol 600 (PEG-600), and polyethylene glycol 800 (PEG-800). The polyethylene glycol with a molecular weight greater than 1,000 is solid and is not easy to add, while the polyethylene glycol with the molecular weight of not more than 1,000 is liquid, which is more convenient to use and operate.

The solubilizer refers to an additive that helps the components such as dyes to dissolve in an ink solvent. The solubilizer is adsorbed on a surface of the dye particle, decreases their surface sizes and prevents aggregation and precipitation between particles. By adding the solubilizer, the solubility of the azo-metal complex dye in the ink is enhanced, so that the dye is evenly dispersed in the ink, and avoid a phenomenon of settling or clumping of the ink in a using process.

In some embodiments, the solubilizer includes one or more of glycerol, ethylene glycol, propylene glycol, ethanol, etc. In some embodiments, the solubilizer is selected from one or a combination of propylene glycol methyl ether, propylene glycol butyl ether, and dipropylene glycol methyl ether. The above-described humectants selected are more suitable for the ink system, resulting in a better solubility and a more evenly dispersion of the azo-metal complex dye in the ink.

In some embodiments, in the marker ink, in parts by weight: the leveling agent accounts for 0.5 to 2 parts, the defoamer accounts for 0.5 to 1 part, the humectant accounts for 2 to 5 parts, and the solubilizer accounts for 15 to 50 parts.

By setting the leveling agent to account for 0.5-2 parts, the defoamer to account for 0.5-1 part, the moisturizing agent to account for 2-5 parts, and the solubilizer to account for 15-50 parts, the proportion is reasonable, and by generating synergistic effects among the components, the dye is evenly and stably dispersed in the marker ink solvent, which significantly improves the performance of marker ink, making it more smooth and long-lasting when writing, while avoiding the ink from drying and precipitation. Each of these components, while with different functions, works together to ensure an efficiency, a weatherability, and a usability of the ink.

One of the embodiments of the present disclosure provides a method for preparing a marker ink including dispersing an azo-metal complex dye and a film-forming resin into ethanol to obtain the marker ink.

One of the embodiments of the present disclosure provides a method for preparing a marker ink, including dispersing an azo-metal complex dye, a film-forming resin, a defoamer, a solubilizer, a humectant, and a leveling agent in the embodiment of the present disclosure into ethanol to obtain the marker ink. In the marker ink, in parts by weight: the azo-metal complex dye accounts for 5 to 20 parts, the film-forming resin accounts for 2 to 10 parts, The ethanol accounts for 25 to 80 parts, the leveling agent accounts for 0.5 to 2 parts, the defoamer accounts for 0.5 to 1 part, the humectant accounts for 2 to 5 parts, and the solubilizer accounts for 15 to 50 parts.

Specifically, FIG. 1 is a flowchart illustrating an exemplary process for preparing a marker ink according to some embodiments of the present disclosure. As shown in FIG. 1, the azo-metal complex dye of the embodiments of the present disclosure is prepared by operations 110-140, and then operation 150 is performed to prepare the marker ink.

In 110, 2-amino-4-nitrophenol-6-sulfonic acid or 2-amino-4-nitrophenol is mixed with NaNO$_2$ and hydrochloric acid and reacted at a certain temperature to obtain a diazonium salt solution.

The diazonium salt solution refers to a solution of a diazonium salt produced by a reaction of a primary amine (i.e., primary amine) with a nitrous acid. The primary amine includes an aliphatic, an aromatic and a heterocyclic primary amine, etc. Because the aliphatic diazonium salts generated by aliphatic primary amines are unstable and prone to decomposition, more stable aromatic primary amines (i.e., aromatic amines) are usually used. The reaction of the aromatic amines and the nitrous acid act to form the diazonium salt is referred to as a diazotization reaction, with the aromatic amines being a diazonium component and the nitrous acid being a diazotizing agent. Because the nitrous acid is unstable, sodium nitrite and a hydrochloric acid (in addition to hydrochloric acid, inorganic acids such as a sulfuric acid, a perchloric acid, and a fluoboric acid are used) are usually used to make the nitrous acid generated during the reaction react immediately with the aromatic amines to avoid decomposition of the nitrous acid.

Understandably, most diazonium salts are more stable at low temperatures, and the decomposition of both the diazonium salts and the nitrous acid accelerate at a higher temperature. Therefore, the diazotization reaction is generally carried out at a lower temperature, e.g., 0° C.-5° C.

In some embodiments, a first weight of aromatic amines and a first volume of hydrochloric acid are weighed and put into a reaction vessel at room temperature, and a first stirring is performed such that the hydrochloric acid dissolves the foregoing diazo component. Then, under a condition of an ice bath, a second weight of NaNO$_2$ is weighed and dissolved with a second volume of water and then added to the reaction vessel, and after an end point is examined with a starch potassium iodide paper, a second stirring is performed, and through a first filtration, the diazonium salt solution is obtained. In some embodiments, the aromatic amine is 2-amino-4-nitrophenol-6-sulfonic acid or 2-amino-4-nitrophenol. In some embodiments, the first weight is in a range of 2 g-4 g. In some embodiments, the second weight is in a range of 15 g-20 g. In some embodiments, a mass fraction of the hydrochloric acid is 35%, and the first volume is in a range of 120 ml-150 ml. In some embodiments, the second volume is in a range of 10 ml-15 ml. In some embodiments, a duration of the second stirring is in a range of 40 min-50 min. In some embodiments, a temperature of the ice bath condition is in a range of 0° C.-5° C.

In some embodiments, a chemical reaction formula involved in a preparation process of the diazonium salt solution is:

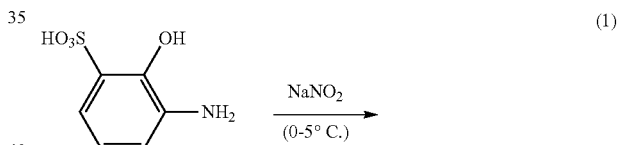

(1)

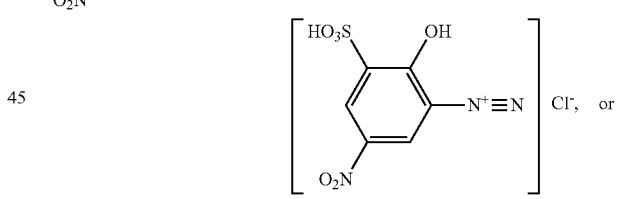

(2)

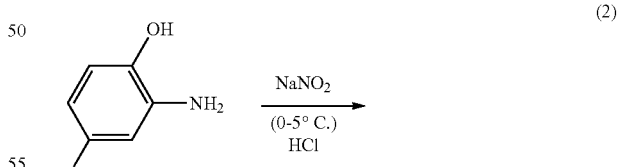

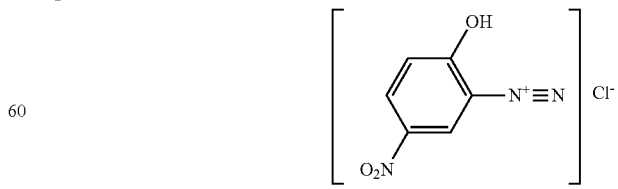

where, a product of the chemical reaction formula (1) for the preparation of the diazonium salt solution is used in a chemical reaction formula (3) for the preparation of the intermediate product in the latter operation 130, and the chemical reaction formula (2) for the preparation of the diazonium salt solution is used in a chemical reaction formula (4) for the preparation of an intermediate product in the latter operation 130.

By mixing 2-amino-4-nitrophenol-6-sulfonic acid or 2-amino-4-nitrophenol with $NaNO_2$ and hydrochloric acid, and reacting at a certain temperature to obtain the diazonium salt solution, a desired diazonium salt solution component is obtained, which is used to provide an azo group for the azo-metal complex dye in subsequent reaction operations. The lower temperature is maintained during the preparation of the diazonium salt solution, thereby effectively avoiding a decomposition of the product and avoiding affecting yield and quality of the diazonium salt solution.

In 120, a 5-ethylacetoacetanilide is dispersed into an alkaline solution to obtain a first mixture.

The first mixture refers to a mixture of the 5-ethylacetoacetanilide and the alkaline solution.

Understandably, a solubility of 5-ethylacetoacetanilide in water is relatively low, and by using the alkaline solution, an alkaline environment is created for a hydrolysis reaction of 5-ethylacetoacetanilide, so that the reaction is more likely to occur. Commonly used alkaline solutions include a sodium hydroxide solution, a potassium hydroxide solution, etc.

In some embodiments, a third weight of 5-ethylacetoacetanilide and a fourth weight of an alkaline solution are put into the reaction vessel at the room temperature and a third stirring is performed to dissolve the 5-ethylacetoacetanilide. In some embodiments, the first weight is in a range of 2 g to 2.5 g. In some embodiments, the alkaline solution is the sodium hydroxide solution, which has a mass fraction of 10%, and the second weight is in a range of 18 g to 22 g.

In 130, an acetic acid solution is added to the first mixture to form a precipitate, and a diazonium salt solution is added under a heating condition to obtain an intermediate product.

It is understood that through the process of dissolving and then precipitating in operation 120 and operation 130, acetoacetanilide is precipitated, so that water-soluble impurities remain in the solution. After performing filtering and washing, etc. on the precipitate, the acetoacetanilide with high purity is be obtained for subsequent reactions.

The intermediate product refers to a dye intermediate that forms the azo-metal complex dye. For example, the intermediate product is the dye molecules (i.e., the ligand in the inner boundary of the complex of the azo-metal complex dye). In some embodiments, the intermediate product is represented by a formula:

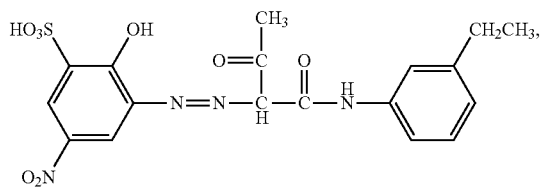 [SMILES: CCc1cccc(NC(=O)C(N=Nc2cc([N+](=O)[O-])cc(S(=O)(=O)O)c2O)C(C)=O)c1]

which is a yellow needle-like crystal.

In some embodiments, the first mixture obtained in operation 120 is subjected to the ice bath, a fifth weight of the acetic acid solution is added to form the precipitate, and under a fourth stirring, the diazonium salt solution obtained in operation 110 is added, and the temperature is raised after the formation of a suspension of the dye. A reaction is performed at the first temperature, then cooled to a second temperature, and a second filtration, a washing and a recrystallization is performed to obtain the intermediate product. In some embodiments, the mass fraction of the acetic acid solution is 70%, and the fifth weight is in a range of 5 g-7 g. In some embodiments, the first temperature is in a range of 85° C.-90° C. In some embodiments, the second temperature is in a range of 70° C.-75° C.

In some embodiments, the chemical reaction formula involved in a process of preparing the intermediate product is:

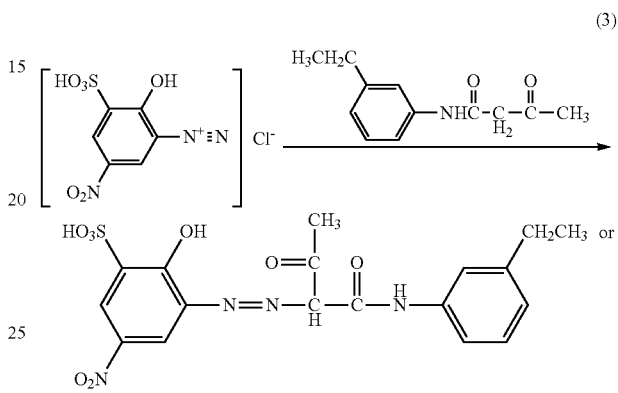

(3)

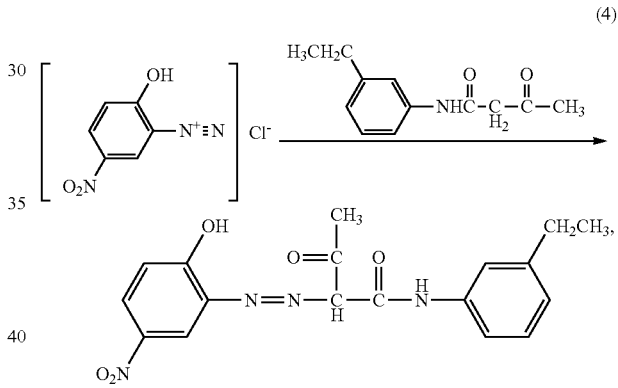

(4)

where, the product of the chemical reaction formula (3) for preparing the intermediate product is used in a chemical reaction formula (5) for preparing the azo-metal complex dye in operation 140 described later, and the product of the chemical reaction formula (4) for preparing the intermediate product is used in a chemical reaction formula (6) for preparing the azo-metal complex dye in operation 140 described later.

In 140, the intermediate product is dispersed into the ethanol, a target compound is added, heating and refluxing, and then cooling are performed to obtain the azo-metal complex dye.

The target compound refers to a compound that provides the center ion M. In some embodiments, the target compound is selected from $CuCl_2 \cdot 2H_2O$, $FeCl_3 \cdot 2H_2O$, $AgNO_3$, and $ZnCl_2 \cdot 2H_2O$.

In some embodiments, a third volume of the ethanol is weighed at the room temperature to dissolve the intermediate product obtained in operation 130; a fourth volume of a concentrated hydrochloric acid and a sixth weight of a solution of the target compound is added dropwise under a fifth stirring, then the product is heated to a third temperature, refluxed, and cooled to the room temperature and then subjected to a third filtration, and the azo-metal complex dye is obtained after the solvent evaporated. In some embodiments, the third volume is in a range of 50 ml-60 ml. In some embodiments, the fourth volume is in a range of 0.1 ml-0.15 ml. In some embodiments, the target compound is $CuCl_2 \cdot 2H_2O$, an amount of a substance of the solution of the target compound is 0.5 mmol, and the sixth weight is in a range of 80 mg-90 mg. In some embodiments, the third temperature is in a range of 80° C.-90° C. In some embodiments, a reflux temperature is in a range of 80° C.-85° C.

In some embodiments, the chemical reaction formula involved in the preparation of the azo-metal complex dye is:

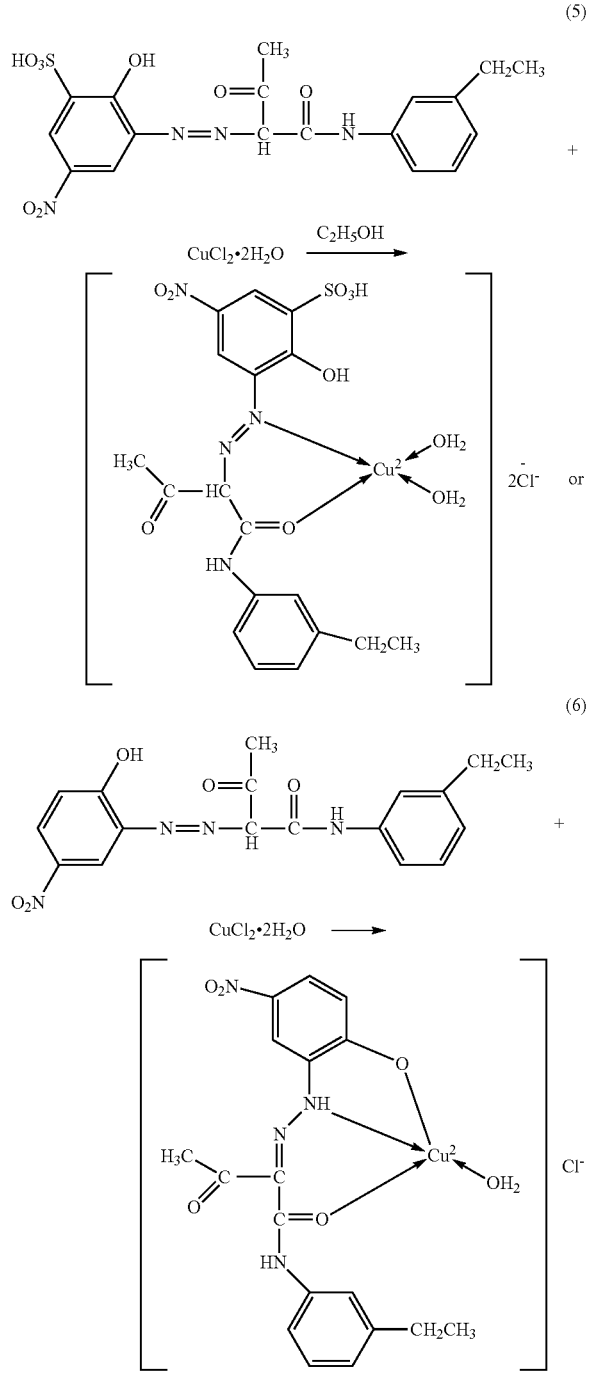

The first mixture is obtained by dispersing the 5-ethylacetoacetanilide into the alkaline solution; the acetic acid solution is added to the first mixture to form the precipitate, and the intermediate product is obtained by adding the diazonium salt solution under the heating condition; the intermediate product is dispersed into the ethanol, and the target compound is added, heated, refluxed and then cooled to obtain the azo-metal complex dye. The target compound is selected from $CuCl_2 \cdot 2H_2O$, $FeCl_3 \cdot 2H_2O$, $AgNO_3$, and $ZnCl_2 \cdot 2H_2O$, in this way, the desired azo-metal complex dye in the embodiments of the present disclosure is accurately obtained.

In 150, by dispersing the azo-metal complex dye and the film-forming resin into the ethanol, the marker ink is obtained.

In some embodiments, 5 to 20 parts of the azo-metal complex dye, 2 to 10 parts of the film-forming resin are dispersed into 25 to 80 parts of the ethanol, and the marker ink is obtained by the sixth stirring until homogeneous. In some embodiments, a duration of the sixth stirring is in a range of 2 h-3 h.

In some embodiments, the azo-metal complex dye, the film-forming resin, the defoamer, a solubilizer, the humectant, and the leveling agent are dispersed into the ethanol to obtain the marker ink. More about the film-forming resin, the defoamer, the solubilizer, the humectant, and the leveling agent are found in the foregoing relevant descriptions, which is not repeated here.

In some embodiments, 15-50 parts of the solubilizer, 25-80 parts of the ethanol are weighted and put into a reaction kettle, and 5-20 parts of the azo-metal complex dye are added at the room temperature, and then stirred through a seventh stirring until the azo-metal complex dye is completely dissolved. Then 2-10 parts of the film-forming resin are weighted and put into the reaction kettle, and stirred through an eighth stirring until the film-forming resin is completely dissolved. Finally, 0.5-2 parts of the leveling agent, 0.5-1 part of the defoamer, 2-5 parts of the humectant are added, and then stirred through a ninth stirring and the third filtration, and the marker ink is obtained. In some embodiments, a rotation speed of the seventh stirring is in a range of 200 r/min-300 r/min. In some embodiments, a duration of the seventh stirring is in a range of 2 h-3 h. In some embodiments, the ninth stirring is in a range of 200 r/min-300 r/min.

By dispersing the azo-metal complex dye and the film-forming resin into the ethanol to obtain the marker ink, an environmentally friendly marker ink with good dispersibility, weather resistance, leakage resistance, and color stacking performance is accurately and efficiently prepared, which balances writing and environmental protection.

It should be noted that the foregoing description of the method for preparing the marker ink is for the purpose of exemplification and illustration only, and does not limit the scope of application of the present disclosure. For those skilled in the art, various corrections and changes are made to the method for preparing the marker ink under the guidance of the present disclosure. However, these corrections and changes remain within the scope of the present disclosure. In some embodiments, a sequence if the operations performed in FIG. 1 is not limiting. For example, the first mixture is obtained by first dispersing the 5-ethylacetoacetanilide into the alkaline solution, and then the 2-amino-4-nitrophenol-6-sulfonic acid, or the 2-amino-4-nitrophenol, is mixed with $NaNO_2$ and hydrochloric acid and then reacted at a certain temperature to obtain the diazonium salt solution.

One of the embodiments of the present disclosure provides a marker including a nib, a body, and an ink. The ink includes the azo-metal complex dye, the film-forming resin, and the ethanol in the embodiment of the present disclosure. More on the azo-metal complex dye, the film-forming resin, and the ethanol may be found in the related description above.

The method for preparing the marker ink is described in detail below by means of Example 1-Example 6, and comparison examples 1-2. It is noted that reaction conditions, reaction materials, and dosages of the reaction materials in Embodiment 1-Embodiment 6, and the comparison examples 1-2 are only for illustrating the method for preparing the marker ink, and do not limit the scope of protection of the present disclosure.

Embodiment 1

(1) Preparing a blue azo-metal complex dye includes:
(a) Preparing the diazonium salt solution:

In a 300 ml three-necked flask, 3.27 g of the 2-amino-4-nitrophenol-6-sulfonic acid or the 2-amino-4-nitrophenol is added as a diazonium salt component, and 120 ml of the concentrated hydrochloric acid with a mass fraction of 35% is then added to the three-necked flask. The aforementioned 2-amino-4-nitrophenol-6-sulfonic acid or 2-amino-4-nitrophenol are stirred, dissolved, and then cooled down to 0° C. in the ice bath, 19.5 g of $NaNO_2$ is weighted and dissolved with 10 ml of water, and then added drop by drop to the three-necked flask, ensuring that the reaction is always performed in the ice bath until the drop is completed, and then checking the end point with a potassium starch iodide test paper, and then continuing to stir for 50 min, filtering to obtain a filtrate for using.

(b) Preparing a coupling component:

2.1 g of the 5-ethylacetoacetanilide is added to a 300 ml triple-necked flask, 21 g of the sodium hydroxide solution with a mass fraction of 10% is added, the 5-ethylacetoacetanilide is stirred and dissolved. The mixture is ice-bathed for 30 min and added with 6 g the acetic acid solution with a mass fraction of 70%, then a precipitate is formed. Then under a stirring condition, the diazonium salt solution is added continuously, and after the pigment suspension is formed, the pigment suspension is heated up to 85° C. and insulated for 65 min, and then cooled down to 70° C., and filtered, washed, and recrystallized to obtain a yellow needle-like crystal.

(c) Synthesizing the azo-metal complex dye:

The prepared 220 mg of the coupling component is dissolved with 60 ml of the ethanol solution at the room temperature, and 2-3 drops of the concentrated hydrochloric acid are added during the stirring, and then 90 mg of $CuCl_2 \cdot 2H_2O$ with a concentration of 0.5 mmol is added slowly dropwise and turns brownish yellow after stirring, then the solution is heated and refluxed for 4 h, cooled to the room temperature and filtered. Synthesizing after slowly evaporating the solvent to obtain the blue azo-metal complex dye.

(2) Preparing the marker ink:

36 parts of the ethanol and 42 parts of the propylene glycol methyl ether are weighted in the reaction kettle, 15 parts of the azomethine complex dye are added at the room temperature, and then stirring for 2 h under a rotation speed of 200-300 r/min to dissolve all the complex dye, and then 3 parts of the polyvinylpyrrolidone resin are added in the reaction kettle and stirred to dissolve, and finally add 0.5 part of BYK-333 leveling agent, 0.3 parts of Deqian 6800 antifoaming agent, 3.2 parts of PEG-600 moisturizing agent, and then stirring for 1 h under a rotation speed of 300 r/min, and then filtering the ink through a filter element with a size of 0.22 um to obtain the marker ink.

Embodiment 2

The specific operations and methods may be referred to in Embodiment 1. It is noted that that a portion of parameters in the following operations are adjusted:

(1) Preparing the blue azo-metal complex dye including:
(a) Preparing the diazonium salt solution: the concentrated hydrochloric acid with a mass fraction of 45%, the temperature of ice bath cooling is 5° C., and a stirring duration is 70 min.

(b) Preparing the coupling component: the mass fraction of the sodium hydroxide solution is 15%, and after forming the pigment suspension, the temperature is raised to 90° C. and insulated for 75 min.

(c) Synthesizing the azo-metal complex dye: adding 3 drops of the concentrated hydrochloric acid, heating and refluxing for 5 h.

(2) Preparing the marker ink: 40 parts of the ethanol, 33 parts of the propylene glycol methyl ether, and 18 parts of the azo-metal complex dye are added, and 2.5 parts of the aldehydes and ketones is used instead of the 3 parts of the polyvinylpyrrolidone resin in Embodiment 1, 0.8 part of the BYK-333 leveling agent and 0.2 part of the Dekian 6800 defoamer, and 3 parts of the PEG-600 humectant are added.

Embodiment 3

The specific operations and methods may be referred to in Embodiment 1. It should be noted that that a portion of the parameters in the following operations are adjusted:

(1) Preparing the blue azo-metal complex dye including:
(a) Preparing the diazonium salt solution: the concentrated hydrochloric acid with a mass fraction of 52%, the temperature of ice bath cooling is 3° C., and the stirring duration is 30 min.

(b) Preparing the coupling component: the mass fraction of the sodium
hydroxide solution is 20%, and after forming the pigment suspension, the temperature is raised to 95° C. and insulated for 55 min.

(c) Synthesizing the azo-metal complex dye: adding 3 drops of the concentrated hydrochloric acid.

(2) Marker ink preparation: 43 parts of the ethanol, 31 parts of the propylene glycol methyl ether, 20 parts of the azo-metal complex dye, 2 parts of the aldehydes and ketones resin are used instead of 3 parts of the polyvinylpyrrolidone resin in Example 1, 0.8 part of the BYK-333 leveling agent and 0.2 part of the Dekian 6800 antifoaming agent are added, 3 parts of propylene glycol humectant are used instead of 3.2 parts of the PEG-600 humectant in Example 1.

Embodiment 4

Operation (1) and the related parameters may be referred to in Embodiment 3; operation (2) may be referred to in Embodiment 1. It should be noted that the following parameters in operation (2) are adjusted:

25 parts of the ethanol are added, no propylene glycol methyl ether is added, 5 parts of the azo-metal complex dye is prepared, and 2 parts of the aldehydes and ketones resin are used instead of 3 parts of polyvinylpyrrolidone resin in Embodiment 1, and no Deqian 6800 antifoam agent and PEG-600 moisturizer is added.

Embodiment 5

Operation (1) and related parameters may be referred to in Embodiment 3; operation (2) may be referred to in Embodiment 1. It should be noted that the following parameters in operation (2) are adjusted:

25 parts of the ethanol is added, 15 parts of the dipropylene glycol methyl ether are used instead of 42 parts of propylene glycol methyl ether in Embodiment 1, 5 parts of the azo-metal complex dye is prepared, and 2 parts of the aldehydes and ketones resin are used instead of 3 parts of polyvinylpyrrolidone resin in Embodiment 1, and 0.5 part of the Deqian 6800 antifoam agent is added, and 2 parts of the propylene glycol humectant are used instead of 3.2 parts of the PEG-600 humectant in Embodiment 1.

Embodiment 6

Operation (1) and related parameters may be referred to in Embodiment 3; operation (2) may be referred to in Embodiment 1. It should be noted that the following parameters in operation (2) are adjusted:

80 parts of the ethanol is added, 50 parts of the dipropylene glycol methyl ether is used instead of 42 parts of propylene glycol methyl ether in Embodiment 1, 20 parts of the azo-metal complex dye are prepared, 10 parts of the aldehydes and ketones are used instead of 3 parts of the polyvinylpyrrolidone resin in Embodiment 1, 2 parts of the BYK-333 leveling agent and 1 part of the Dekum 6800 defoamer are added, and 5 parts of the propylene triol moisturizer are used instead of 3.2 parts of PEG-600 moisturizing agent in Embodiment 1.

Comparison Example 1

(1) Obtaining a commercially available direct dye.
Operation (2) and the related parameters are referred to in Embodiment 3, and it should be noted that the commercially available direct dye is used instead of the azo-metal complex dye in Embodiment 3.

Comparison Example 2

(1) Obtaining an acid dye.
Operation (2) and the related parameters are referred to in Embodiment 2, and it should be noted that the acid dye is used instead of the azo-metal complex dye in Embodiment 2.

Performance Measurement and Results Analysis
(1) Stability and Writing Performance Tests The marker inks produced by Embodiments 1-6, and comparison example 1-2 are frozen for 2 weeks and aged at 60° C. for 2 weeks, and it is measured that the performance of the marker ink based on the preparation method for the foregoing embodiments is stable, and that the writing effect is smooth with bright colors after a pen loading test. It indicates that the alcoholic marker ink produced by the embodiments of the present disclosure meets basic requirements of coloring and writing.

(2) Weather Resistance Test (Including a Sunlight Resistance Test and an Ozone Resistance Tests Understandably, the ultraviolet light sunlight and the ozone in atmosphere cause the ink to become less weather resistant. Therefore, a strength of the weather resistance of the ink is determined by a color density decay of the writing ink after performing a certain period of time of UV xenon irradiation and ozone sterilizer disinfection treatment on the writing ink.

Specifically, the marker inks of Embodiments 1-6, and the comparison examples 1-2, respectively, are scraped onto a white cardboard using a scraper.

(a) Sunlight resistance test: testing color densities of the scraper blocks of Embodiments 1-6 using a color density tester SpectroEye, irradiating for 4 h using a xenon lamp, and then testing the color density of the color block again, counting an decay rate of the color density of the color blocks before and after the irradiation of the xenon lamp, the greater the decay rate of the color density, the poorer the sunlight resistance; and the smaller the decay rate, the better the sunlight resistance, and the test result is shown in Table 1. From data in the table, it is seen that the decay rates of the color densities of the inks in Embodiments 1-6 before and after being irradiated by the xenon lamp is less than 6%, and it is concluded that the inks obtained in Embodiments 1-6 have excellent sun resistances. While the inks obtained in Comparison examples 1-2 has the color density decay rates of about 70% before and after irradiation by the xenon lamp, and have poor sunlight resistances.

TABLE 1

| / | Embodiment 1 | Embodiment 2 | Embodiment 3 | Embodiment 4 | Embodiment 5 | Embodiment 6 | Comparison example 1 | Comparison example 2 |
| --- | --- | --- | --- | --- | --- | --- | --- | --- |
| color density before the xenon lamp | 0.99 | 0.97 | 0.98 | 0.94 | 0.95 | 0.96 | 0.95 | 0.97 |
| color density after the xenon lamp | 0.97 | 0.95 | 0.94 | 0.89 | 0.90 | 0.92 | 0.21 | 0.30 |
| color density decay rate % | 2.02% | 2.06% | 4.08% | 5.32% | 5.26% | 4.17% | 77.9% | 69.1% |

(b) Ozone resistance test: after testing the color densities of the color blocks of Embodiments 1-6 and comparison examples 1-2 using the color density tester SpectroEye, and then placing the color blocks in an ozone sterilizer for 4 h, then testing the color densities of the color blocks again, and calculating the decay rate of the color densities of the color blocks before and after irradiation with the xenon lamp, and the greater the decay rates of the color densities, the poorer the ozone resistances, and the smaller the decay rates of the color densities, the better the ozone resistances. The results of the tests are shown in Table 2. From the data in the table, it is seen that the color density decay rate of the inks in Embodiments 1-6 before and after being placed in the ozone sterilizer is less than 11%, and it is concluded that the inks obtained in Embodiments 1-6 have excellent ozone resistances. While the obtained in Comparison examples 1-2 have a color density decay rate of about 75% before and after irradiated by the xenon lamp, the inks have poor ozone resistances.

nitro groups, etc.), the antioxidant groups (e.g., the phenolic hydroxyl groups, etc.), the polar groups (e.g., the nitro, the sulfonic acid, the hydroxyl, etc.), and the environmentally friendly metal ions (e.g., the copper ions, the anionic ions, the zinc ions, etc.) in its structure and a film-forming resin in the ethanol, the marker ink prepared is able to maintain stable in the ultraviolet, oxygen, ozone and other environments to ensure the long-lasting coloring performance. At the same time, the mark ink is not easy to penetrate, so as to avoid the wet and dry color differences of the marker ink in writing and drawing, and make the ink to have a certain degree of color stacking performance. Further, an alcohol solubility of the mark ink is good, making the ink well adapted to an alcohol-soluble ink system, to avoid ketones, benzene and other irritating solvents to intervene. The use of environmentally friendly metal ions instead of chromium ions, cobalt ions and other toxic heavy metal ions, the ink is environmentally friendly, which brings no health and safety hazards to the user.

| / | Embodiment 1 | Embodiment 2 | Embodiment 3 | Embodiment 4 | Embodiment 5 | Embodiment 6 | Comparison example 1 | Comparison example 2 |
|---|---|---|---|---|---|---|---|---|
| Before ozone processing | 0.99 | 0.97 | 0.98 | 0.94 | 0.95 | 0.96 | 0.95 | 0.97 |
| After ozone processing | 0.93 | 0.94 | 0.92 | 0.87 | 0.85 | 0.91 | 0.17 | 0.25 |
| color density decay rate % | 6.06% | 3.09% | 6.12% | 7.45% | 10.5% | 5.21% | 82.1% | 74.2% |

(3) Penetration Testing

The penetration of the ink into the paper is one of the factors causing the color difference in writing or drawing, and the stronger the penetration of the ink, the greater a chance of the color difference, and the worse the effect of the color stacking. Observing the penetration of the ink on the paper by writing on A4 paper with the ink loaded pen produced by Embodiments 1-6, and Comparison examples 1-2, the test results in Table 3 are obtained. From the data in the table, it is seen that the inks of Embodiments 1-6 have only a slight penetration, and have certain degrees of color stacking performances. And the inks obtained in Comparison examples 1-2 have serious penetrations, and basically do not have the color stacking performance.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements, and amendments to the present disclosure. These modifications, improvements, and amendments are intended to be suggested by the present disclosure, and are within the spirit and scope of the exemplary embodiments of the present disclosure.

Meanwhile, the present disclosure uses specific words to describe the embodiments of the present disclosure. For example, "one embodiment", "an embodiment", and/or

| / | Embodiment 1 | Embodiment 2 | Embodiment 3 | Embodiment 4 | Embodiment 5 | Embodiment 6 | Comparison example 1 | Comparison example 2 |
|---|---|---|---|---|---|---|---|---|
| Paper penetration result | Slightly penetrated | Slightly penetrated | Slightly penetrated | Slightly penetrated | Slightly penetrated | Slightly penetrated | Severe penetrated | Severe penetrated |
| Color stacking performance | yes | yes | yes | yes | yes | yes | no | no |

RESULTS ANALYSIS

In summary, in the marker ink and the method for preparing the marker ink of the embodiments of the present disclosure, by dispersing the azo-metal complex dye including the unsaturated groups containing the π-bonds (e.g., the benzene rings, the carboxyl groups, the ester groups, the "some embodiments" refer to a certain feature, structure or characteristic related to at least one embodiment of the present disclosure. Therefore, it should be emphasized and noted that references to "one embodiment" or "an embodiment" or "an alternative embodiment" two or more times in different places in the present disclosure do not necessarily refer to the same embodiment. In addition, certain features, structures, or characteristics in one or more embodiments of the present disclosure may be properly combined.

In addition, unless clearly stated in the claims, the sequence of processing elements and sequences described in the present disclosure, the use of counts and letters, or the use of other names are not used to limit the sequence of processes and methods in the present disclosure. While the foregoing disclosure has discussed by way of various examples some embodiments of the invention that are presently believed to be useful, it should be understood that such detail is for illustrative purposes only and that the appended claims are not limited to the disclosed embodiments, but rather, the claims are intended to cover all modifications and equivalent combinations that fall within the spirit and scope of the embodiments of the present disclosure. For example, although the implementation of various components described above may be embodied in a hardware device, it may also be implemented as a software only solution, e.g., an installation on an existing server or mobile device.

In the same way, it should be noted that in order to simplify the expression disclosed in this disclosure and help the understanding of one or more embodiments of the invention, in the foregoing description of the embodiments of the present disclosure, sometimes multiple features are combined into one embodiment, drawings or descriptions thereof. This method for disclosure does not, however, imply that the subject matter of the disclosure requires more features than are recited in the claims. Rather, claimed subject matter may lie in less than all features of a single foregoing disclosed embodiment.

In some embodiments, counts describing the quantity of components and attributes are used. It should be understood that such counts used in the description of the embodiments use the modifiers "about", "approximately" or "substantially" in some examples. Unless otherwise stated, "about", "approximately" or "substantially" indicates that the stated figure allows for a variation of ±20%. Accordingly, in some embodiments, the numerical parameters used in the disclosure and claims are approximations that can vary depending upon the desired characteristics of individual embodiments. In some embodiments, numerical parameters should consider the specified significant digits and adopt the general digit retention method. Although the numerical ranges and parameters used in some embodiments of the present disclosure to confirm the breadth of the range are approximations, in specific embodiments, such numerical values are set as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A marker ink, comprising: an azo-metal complex dye, a film-forming resin, and ethanol, wherein the azo-metal complex dye is represented by a formula:

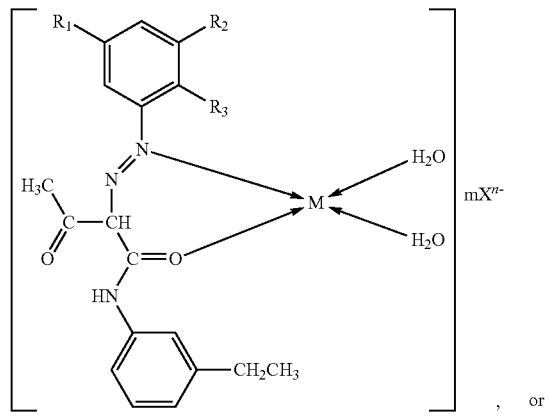

, or

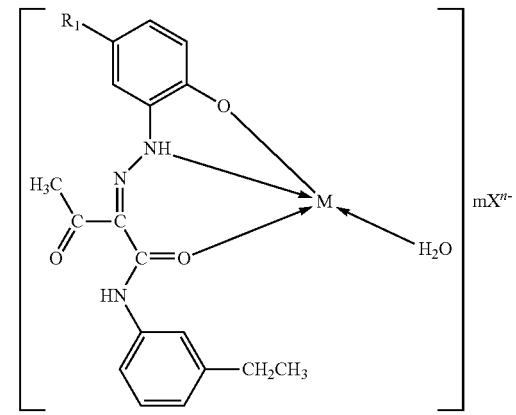

where $R_1$, $R_2$, and $R_3$ are polar groups, M is a metal ion, $mX^{n-}$ is an optionally present anion, and when $mX^{n-}$ is present, n and m are positive integers.

2. The marker ink of claim 1, wherein
M is selected from $Cu^{2+}$, $Fe^{3+}$, $Ag^+$, and $Zn^{2+}$,
and if $mX^{n-}$ is present, X is Cl, n is 1, and m is in a range of 1-3, or $mX^{n-}$ is not present.

3. The marker ink of claim 2, wherein $R_1$, $R_2$, and $R_3$ are independently selected from $NO_2$, $SO_3H$, and OH.

4. The marker ink of claim 3, wherein the azo-metal complex dye is represented by a formula:

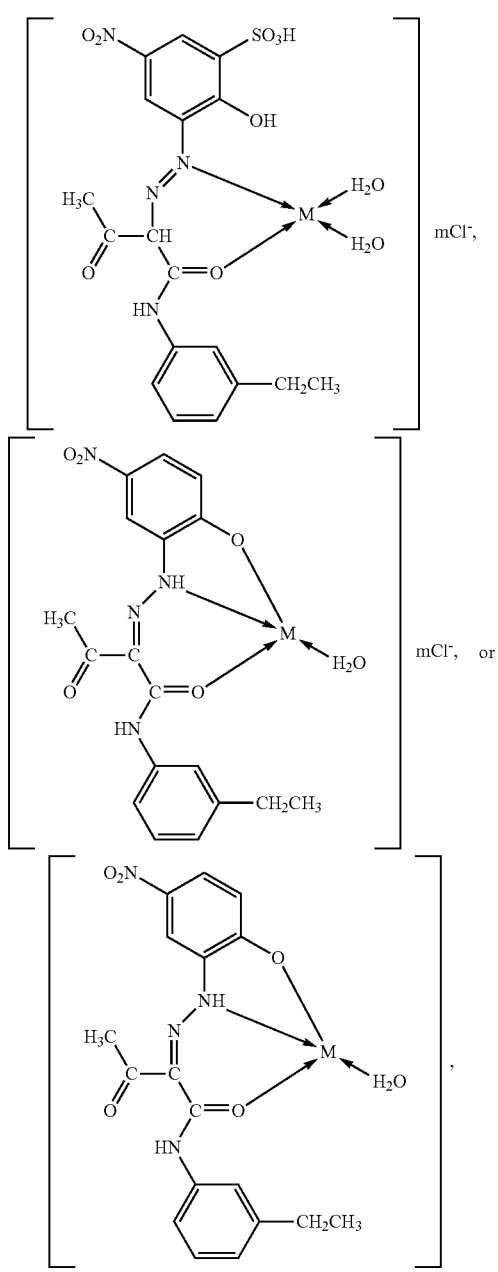

where M is selected from $Cu^{2+}$, $Fe^{3+}$, $Ag^+$, and $Zn^{2+}$.

5. The marker ink of claim 1, wherein the film-forming resin is selected from one or more of an aldehydic ketone resin, a polyvinylpyrrolidone resin, or an alcohol-soluble acrylic resin.

6. The marker ink of claim 1, wherein in the marker ink, in parts by weight:
the azo-metal complex dye accounts for 5 to 20 parts,
the film-forming resin accounts for 2 to 10 parts, and
the ethanol accounts for 25 to 80 parts.

7. The marker ink of claim 6, further comprising: a leveling agent, a defoamer, a humectant, and a solubilizer.

8. The marker ink of claim 7, wherein the leveling agent is selected from one or more of a polyether or an organosilane.

9. The marker ink of claim 7, wherein the defoamer is selected from one or more of a 6800 defoamer produced by Deuchem (Shanghai) Chemical Co. Ltd, a DF-114 defoamer produced by Dow Chemical Company, or an Airex 904W defoamer produced by Evonik Industries AG.

10. The marker ink of claim 7, wherein the humectant is selected from one or more of a polyethylene glycol, a 1,4-butanediol, a glycerol, a castor oil, an ethylene glycol, a diethylene glycol, or a benzyl alcohol.

11. The marker ink of claim 10, wherein the humectant is selected from one or more of a polyethylene glycol 400 (PEG-400), a polyethylene glycol 600 (PEG-600), or a polyethylene glycol 800 (PEG-800).

12. The marker ink of claim 7, wherein the solubilizer is selected from one or more of a propylene glycol methyl ether, a propylene glycol butyl ether, or a dipropylene glycol methyl ether.

13. The marker ink of claim 7, wherein in the marker ink, in parts by weight:
the leveling agent accounts for 0.5 to 2 parts,
the defoamer accounts for 0.5 to 1 part,
the humectant accounts for 2 to 5 parts, and
the solubilizer accounts for 15 to 50 parts.

14. A method for preparing a marker ink, comprising:
dispersing an azo-metal complex dye and a film-forming resin into ethanol to obtain the marker ink, wherein the marker ink includes the azo-metal complex dye, the film-forming resin, and the ethanol, and the azo-metal complex dye is represented by a formula:

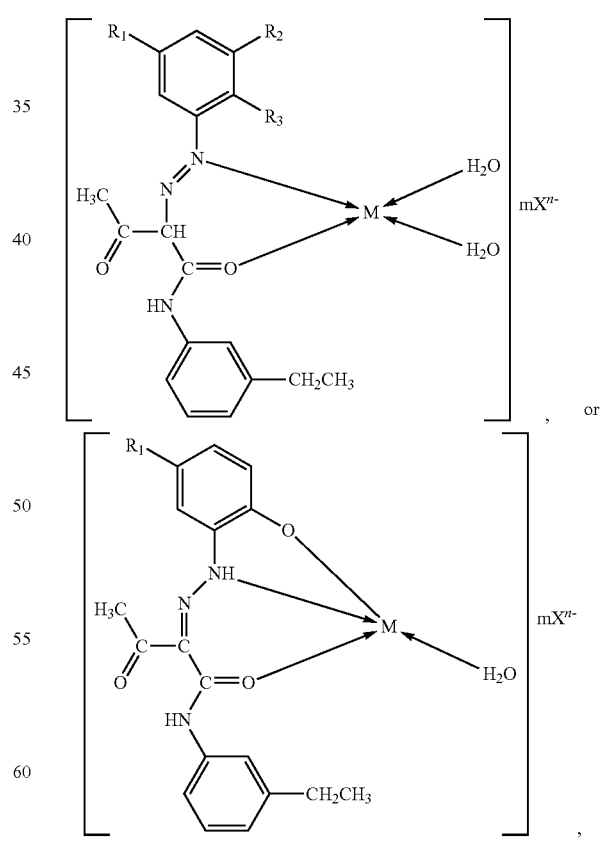

where $R_1$, $R_2$, and $R_3$ are polar groups, M is a metal ion, $mX^{n-}$ is an optionally present anion, and when $mX^{n-}$ is present, n and m are positive integers.

15. The method for claim 14, wherein
M is selected from $Cu^{2+}$, $Fe^{3+}$, $Ag^+$, and $Zn^{2+}$,
R1, R2, R3 are independently selected from $NO_2$, $SO_3H$, and OH,
and if $mX^{n-}$ is present, X is Cl, n is 1, and m is in a range of 1-3, or $mX^{n-}$ is not present.

16. The method for claim 15, wherein the azo-metal complex dye is represented by a formula:

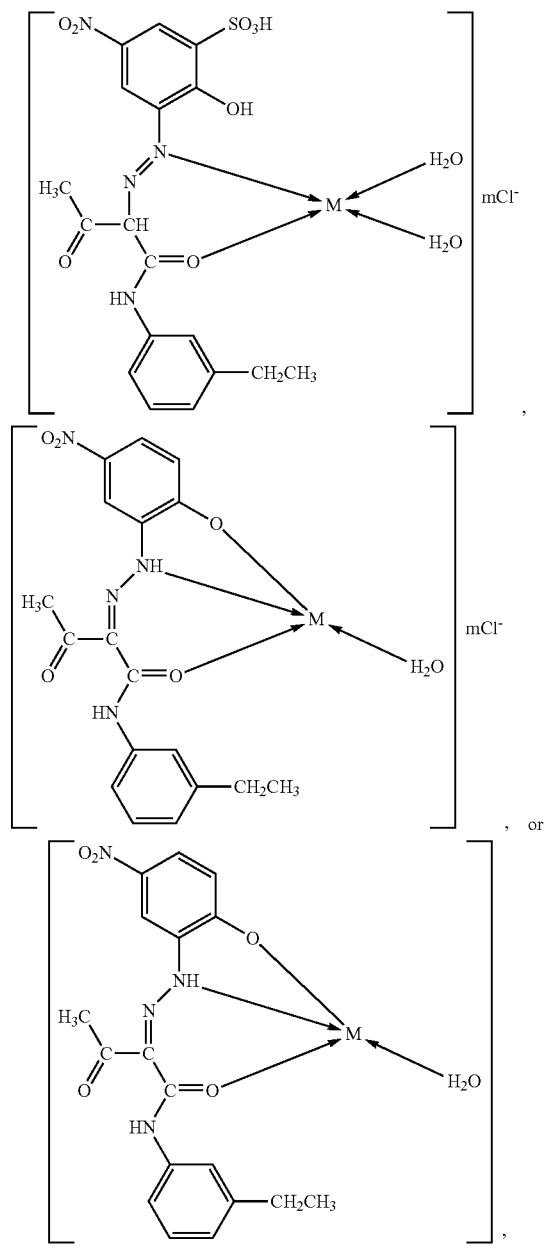

where M is selected from $Cu^{2+}$, $Fe^{3+}$, $Ag^+$, and $Zn^{2+}$.

17. The method for claim 16, wherein the azo-metal complex dye is prepared by:
dispersing a 5-ethylacetoacetanilide into an alkaline solution to obtain a first mixture;
adding an acetic acid solution to the first mixture to form a precipitate, adding a diazonium salt solution under a heating condition to obtain an intermediate product; and
dispersing the intermediate product into the ethanol, adding a target compound, heating and refluxing, and then cooling to obtain the azo-metal complex dye, the target compound being selected from $CuCl_2 \cdot 2H_2O$, $FeCl_3 \cdot 2H_2O$, $AgNO_3$, and $ZnCl_2 \cdot 2H_2O$.

18. The method for claim 17, wherein the diazonium salt solution is prepared by:
mixing a 2-amino-4-nitrophenol-6-sulfonic acid or a 2-amino-4-nitrophenol with $NaNO_2$ and a hydrochloric acid, and
reacting at a certain temperature to obtain the diazonium salt solution.

19. The method for claim 14, further comprising:
dispersing the azo-metal complex dye, the film-forming resin, a defoamer, a solubilizer, a humectant, and a leveling agent into the ethanol to obtain the marker ink, wherein in the marker ink, in parts by weight:
the azo-metal complex dye accounts for 5 to 20 parts,
the film-forming resin accounts for 2 to 10 parts,
the ethanol accounts for 25 to 80 parts,
the leveling agent accounts for 0.5 to 2 parts,
the defoamer accounts for 0.5 to 1 part,
the humectant accounts for 2 to 5 parts, and
the solubilizer accounts for 15 to 50 parts.

20. A marker pen, comprising: a nib, a body, and an ink, wherein the ink includes an azo-metal complex dye, a film-forming resin, and ethanol, wherein the azo-metal complex dye is represented by a formula:

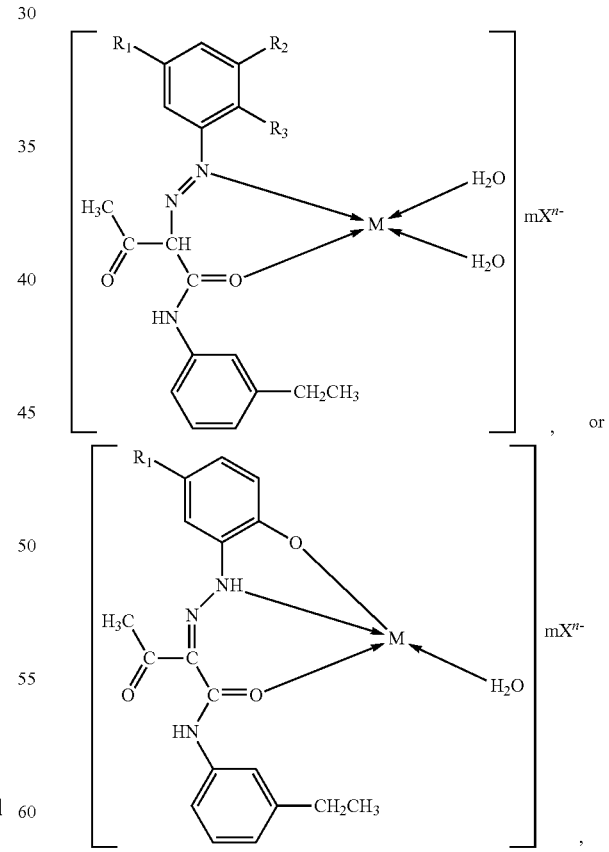

where $R_1$, $R_2$, and $R_3$ are polar groups, M is a metal ion, $mX^{n-}$ is an optionally present anion, and when $mX^{n-}$ is present, n and m are positive integers.

* * * * *